US012754811B2

(12) United States Patent
Woll

(10) Patent No.: US 12,754,811 B2
(45) Date of Patent: Oct. 6, 2026

(54) METHOD AND DEVICE FOR PREDICTING AN ERROR OF A DEVICE BATTERY

(71) Applicant: Robert Bosch GmbH, Stuttgart (DE)

(72) Inventor: Christoph Woll, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 18/753,050

(22) Filed: Jun. 25, 2024

(65) Prior Publication Data

US 2025/0021454 A1 Jan. 16, 2025

(30) Foreign Application Priority Data

Jul. 13, 2023 (DE) ..................... 10 2023 206 657.2

(51) Int. Cl.
*G06F 11/22* (2006.01)

(52) U.S. Cl.
CPC ................................ *G06F 11/2273* (2013.01)

(58) Field of Classification Search
CPC ..... G06F 11/22; G06F 11/2273; G06F 18/217
See application file for complete search history.

(56) References Cited

U.S. PATENT DOCUMENTS

| | | | | |
|---|---|---|---|---|
| 6,888,468 | B2 * | 5/2005 | Bertness | H01M 50/581 320/132 |
| 12,159,090 | B2 * | 12/2024 | Liu | H02J 3/322 |
| 2004/0140904 | A1 * | 7/2004 | Bertness | H01M 50/581 340/636.15 |
| 2019/0212391 | A1 * | 7/2019 | Koller | B60L 58/16 |
| 2021/0405104 | A1 | 12/2021 | Naderivesal et al. | |
| 2023/0222852 | A1 * | 7/2023 | Duan | G06N 5/022 701/31.9 |
| 2023/0288490 | A1 * | 9/2023 | Du | B60L 3/0046 |
| 2023/0358814 | A1 * | 11/2023 | Kang | B60L 58/12 |
| 2023/0360133 | A1 * | 11/2023 | Kang | G06Q 40/06 |
| 2023/0360375 | A1 * | 11/2023 | Kabzan | G06N 20/00 |

FOREIGN PATENT DOCUMENTS

| | | | |
|---|---|---|---|
| DE | 102020212277 | A1 | 3/2022 |
| WO | 2023273971 | A1 | 1/2023 |

* cited by examiner

*Primary Examiner* — Kamini B Patel
(74) *Attorney, Agent, or Firm* — Michael Best & Friedrich LLP

(57) ABSTRACT

A computer-implemented method for providing a risk value for a predicted error in a device battery of a technical device using an error evaluation model, wherein the error evaluation model has at least one error factor assignment table. In one example, the method includes detecting temporal operational variable profiles of at least one device battery; performing an anomaly detection as a function of the temporal operational variable profiles; upon recognizing an anomaly, detecting error-relevant variables; evaluating the error evaluation model as a function of the error-relevant variables in order to determine an error type of a predicted error; assigning error factors to the error type using the at least one provided error factor assignment table of the error evaluation model; determining a risk value as a function of the error factors; and signaling the risk value.

13 Claims, 2 Drawing Sheets

METHOD AND DEVICE FOR PREDICTING AN ERROR OF A DEVICE BATTERY

BACKGROUND

The invention relates to predicting errors in device batteries, in particular based on an anomaly evaluation.

Components of a vehicle are typically monitored for their technical function. As a rule, relevant operational variables are evaluated based on rules in order to determine abnormalities or errors using threshold value comparisons. If such an error occurs, it can be signaled to a user of the technical device or stored in an error memory for subsequent evaluation.

So far, however, if an abnormality or atypical behavior occurs, the user is requested to have an appropriate repair or maintenance performed. However, due to the different possible error types, it is necessary to classify the instructions for action in the form of appropriate signaling. Not every abnormality that occurs requires an immediate visit to the workshop, but it can be sufficient to record it accordingly so that it can be evaluated and, if necessary, rectified during the next workshop visit. Other errors require a visit to the workshop as quickly as possible within a few days, while critical errors, such as a thermal runaways of a battery, require an immediate operational stop and the user to be kept away from the technical device in order to avoid a hazard.

As a rule, errors are announced early due to abnormalities or atypical behavior of the corresponding component and can be detected by appropriate rule-based evaluation. This allows errors to be predicted so that the user can be informed in a timely manner of an impending error.

Methods for predictive error detection are known from the publication DE 10 2020 212 277 A1, for example. Described herein is a method for the predictive diagnosis of an electric drive system by evaluating known and unknown error types.

Furthermore, publication US 2021/0405104 A1 discloses a computer-implemented method for predicting battery failures, comprising: calculating a plurality of respective predictive values using a plurality of respective algorithms, wherein each of the plurality of respective algorithms uses historical battery data and current battery data; calculating an overall reliability of the prediction of a battery error using the plurality of respective predictive values; and providing an indication of a predicted battery failure based on the calculated overall safety.

SUMMARY

According to the invention, there is provided a method for predictive detection and evaluation of an error of a device battery as well as a corresponding device.

Further configurations are specified in the dependent claims.

According to a first aspect, a computer-implemented method for providing a risk value for a predicted error in a device battery of a technical device is provided using an error evaluation model, wherein the error evaluation model has at least one error factor assignment table, with the steps of:

- detecting temporal operational variable profiles of at least one device battery;
- performing an anomaly detection as a function of the temporal operational variable profiles;
- upon recognizing an anomaly, detecting error-relevant variables;
- evaluating the error evaluation model as a function of the error-relevant variables in order to determine an error type of a predicted error;
- assigning error factors to the error type using the provided error factor assignment table of the error evaluation model;
- determining a risk value as a function of the error factors;
- signaling the risk value.

As described above, abnormalities and atypical behavior of a device battery can be detected by rule-based evaluation, such as threshold value comparisons of operational variables, parameters of a battery model describing the current state of the device battery, and the like. If an anomaly or unexpected behavior occurs, a monitoring mode is started, in which one or more error-relevant variables are recorded, in particular with a scanning grid with higher sampling rates.

The error-relevant variables to be recorded are determined according to an assignment table as a function of the variable from which the anomaly has been derived, e.g., based on rules. For example, the error-relevant variables can comprise the frequency of balancing or the temperature behavior, the state of charge profile, the OCV profile (profile of the open-circuit voltage characteristic), in particular at low states of charge, the aging state profile, the charging behavior, the cell pressure profile, and the like.

The monitored error-relevant variables can be analyzed using feature extraction. For example, the gradient of one or more of the error-relevant variables can be determined, which is particularly relevant for the effect of the error, or histograms are created, e.g., via the temporal distribution of the battery temperature and/or the distribution of cell pressures of the battery cells and/or the distribution of cell voltages (for detecting deep discharges) that can provide information about the error effect. Error-related features are obtained that can be appropriately assigned error factors using an error factor assignment table.

The error factors can indicate the propagation speed of the error, the severity of the error, and the propagation probability of the error. The propagation speed indicates how quickly an expected error can progress and lead to a complete or critical failure or hazard. The severity of the error indicates the effect of the error on the operational capability of the battery. The propagation probability indicates a probability that the expected error will actually result from the detected anomaly or the unexpected behavior. By multiplying these error factors, the risk for the expected error can be determined in the form of a risk value.

The error factors can be categorized with values within a predetermined range, for example between 0 and 10. Thus, a range of values between 0 and 1000 can result for the risk value in this example.

Depending on the level of the risk value, an instruction for action can now be issued to the user of the device battery. If there is a low risk, a reduction in power can be activated, e.g., by a current limit. Such a reduction in power can also be signaled to the user accordingly.

Furthermore, with higher risk values, corresponding instructions for action to switch off the technical device or to perform repair or maintenance of the technical device can be signaled. In the case of particularly critical errors indicated by very high risk values, the device battery can be completely switched off immediately.

An extreme example of an error type is a thermal runaway, in case of which the propagation speed is assigned a high value, as a thermal runaway of a device battery can lead to a very fast temperature increase and a fire in the device battery. Also, the severity of the fault in question is to be assigned a high value, as such an error can lead to a fire in the device battery and ultimately the technical device. As a thermal runaway of the device battery can no longer be stopped after its occurrence, the propagation probability must also be provided with a correspondingly high value.

The accuracy of the risk assessment and the corresponding instruction for action derived therefrom depends on the error factor assignment tables, which assign the error corresponding classifications of the error factors, such as the propagation speed, the error severity, and the propagation probability, to the error-relevant features.

It can be provided that at least one of the steps of performing the anomaly detection and evaluating the error evaluation model is performed in a central processing unit remote from the device.

The method can be performed at least in part in a central processing unit remote from the device. A plurality of technical devices is monitored accordingly for this purpose and, if an error occurs, a corresponding evaluation is performed. The operational variables can be transmitted from the technical devices to the central processing unit for this purpose. Abnormalities and unexpected behavior can be detected there and all possible error-relevant variables can be recorded by signaling to the relevant technical devices. If an error-relevant variable is an operational variable, it can be detected at an increased sampling rate and transmitted to the central processing unit.

The devices can be monitored to create the error factor assignment table. If an error ultimately occurs, the corresponding error type can be assigned to a previously found anomaly. By evaluating the error-relevant variables, the propagation speed, i.e., the speed at which the error develops, can be determined, e.g., by classifying the time duration between a determination of the anomaly and the occurrence of the corresponding error into an error factor.

Depending on the degree of risk resulting from the error type or the remaining usability of the device battery, the error severity can be classified so that, for example, a remaining useful life at the time the error occurs can be assigned according to the error severity by means of a corresponding classification. For example, in the event of a total failure and a risk to the user and technical device, the error severity can be set at 10, according to the above example scale. If only a deterioration in the performance of the device battery occurs and is still useful, the severity error can be classified with a low error severity value of between 1 and 5, according to the above example scale, corresponding to the remaining useful life.

Furthermore, the error evaluation model is updated in a central processing unit based on operational variable profiles of a plurality of device batteries as a function of a detected anomaly and a subsequently occurring error of a certain error type.

By observing a plurality of device batteries, identical anomalies and unexpected behavior can be evaluated by determining the probability of how many of the device batteries thus determined will develop an error type once the anomaly in question has been detected. The propagation probability can be derived from this, wherein the value of 10 can indicate a safe development of the respective error and a value of 0 or 1, according to the above example scale, can indicate a rare development of the corresponding error type.

The above method makes it easy to predict a fault of a certain error type with little computational effort and to provide the user of the technical device with instructions for action early on.

BRIEF DESCRIPTION OF THE DRAWINGS

Embodiments are explained in more detail below with reference to the accompanying drawings. Shown are.

DETAILED DESCRIPTION

In the following, the method according to the invention is described using vehicle batteries as device batteries in a plurality of motor vehicles as similar devices. In the central processing unit, an error evaluation model with an error factor assignment table is optimized and continuously improved. The error evaluation model can be evaluated in the central processing unit or the error factor assignment table can be transmitted to the control devices of the vehicles of the vehicle fleet, so that, upon detection of an anomaly using the error evaluation model, instructions for action for a possible error can be communicated to the user of the vehicle early on.

The above example is representative of a plurality of stationary or mobile devices with a network-independent energy supply, such as vehicles (electric vehicles, pedelecs, etc.), systems, machine tools, household appliances, IoT devices, and the like, which are connected via a corresponding communication connection (e.g., LAN, Internet) to an external central processing unit (cloud).

Figure 1:
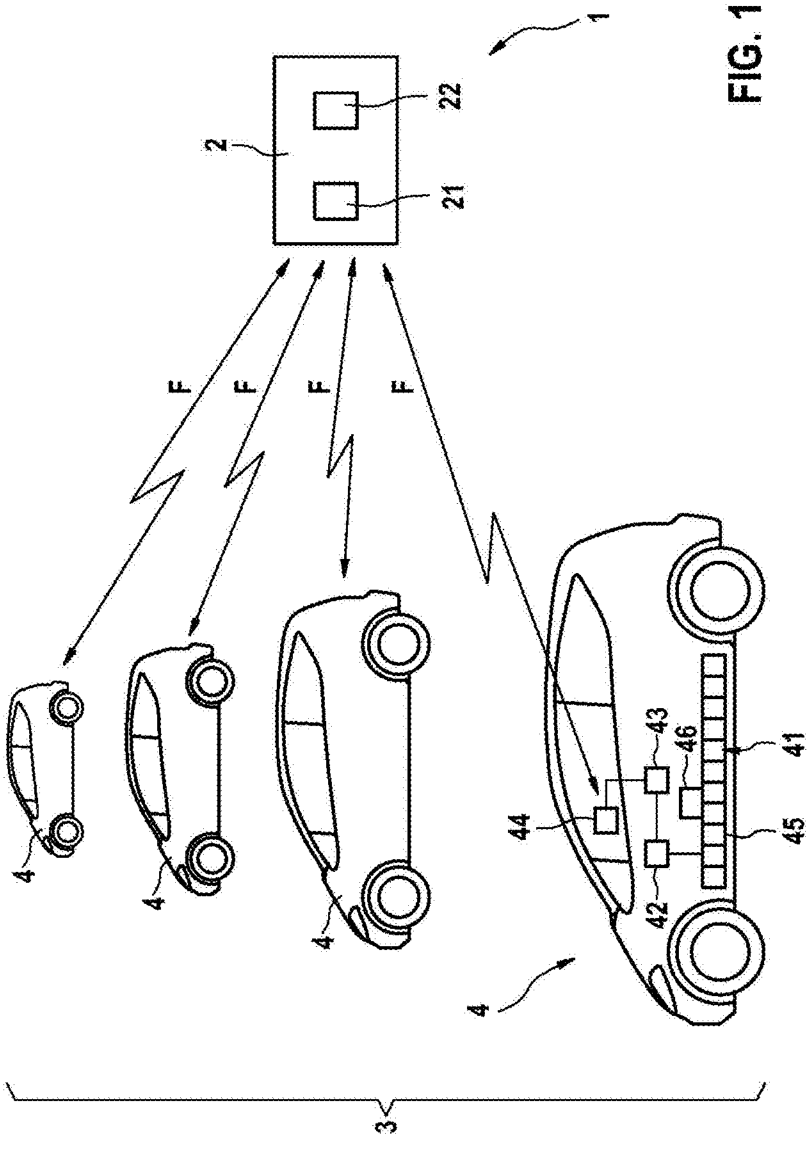
FIG. 1 shows a schematic representation of a system for providing driver- and vehicle-specific operating variables for providing an instruction for action after an anomaly of a vehicle battery has occurred.

FIG. 1 shows a system 1 for collecting fleet data in a central processing unit 2 for creating and for operating an error evaluation model. Operating variables can be recorded in the central processing unit 2 and an electrochemical battery model for modeling internal battery states of the vehicle battery, a battery performance model for modeling electrical parameters, an aging state model for determining an aging state of a vehicle battery in a vehicle, and/or statistical and/or aggregate methods can be used for feature extraction.

FIG. 1 shows a vehicle fleet 3 with several motor vehicles 4. One of the motor vehicles 4 is shown in greater detail in FIG. 1. The motor vehicles 4 each have a vehicle battery 41 with battery cells 45, an electric drive motor 42 and a control unit 43. The control unit 43 is connected to a communication device 44, which is suitable for transmitting data between the respective motor vehicle 4 and a central processing unit 2 (a so-called cloud).

In particular, the control unit 43 is designed to use a battery management system 46 to acquire operating variables of the vehicle battery 41 with a high temporal resolution, such as between 1 Hz and 50 Hz, e.g., 10 Hz, and to transmit these to the central processing unit 2 via the communication device 44 in a suitable manner.

The motor vehicles 4 transmit to the central processing unit 2 the operating variables F, which at least indicate variables that influence or are influenced by the battery state of the vehicle battery 41, and which are required for determining the internal battery states, an aging state, a parameterization of an electrochemical battery model. In the case of a vehicle battery, the operating variables F can indicate an instantaneous battery current, an instantaneous battery voltage, an instantaneous battery temperature and an instantaneous state of charge (SOC).

The operating variables F are acquired in a fast chronological grid from 0.1 Hz to 50 Hz as operating variable profiles, and can be transmitted regularly to the central processing unit 2 in uncompressed and/or compressed form. For example, by using compression algorithms, the time series can be transmitted to the central processing unit 2 in blocks at intervals of 10 min to several hours in order to minimize data traffic to the central processing unit 2.

The central processing unit 2 has a data processing unit 21, in which part of the method described below can be carried out, and a database 22 for storing data points, model parameters, states and the like.

The central processing unit 2 can be configured to receive the operational variable profiles F from all vehicles 3. The central processing unit 2 can detect anomalies of a vehicle battery 41 based on rules and/or data, depending on the operational variable profiles, and detect errors over time. In the central processing unit 2 or in the relevant vehicle 3, an error evaluation model can be created for the anomaly found or the type of anomaly and using a subsequently occurring error.

Figure 2:
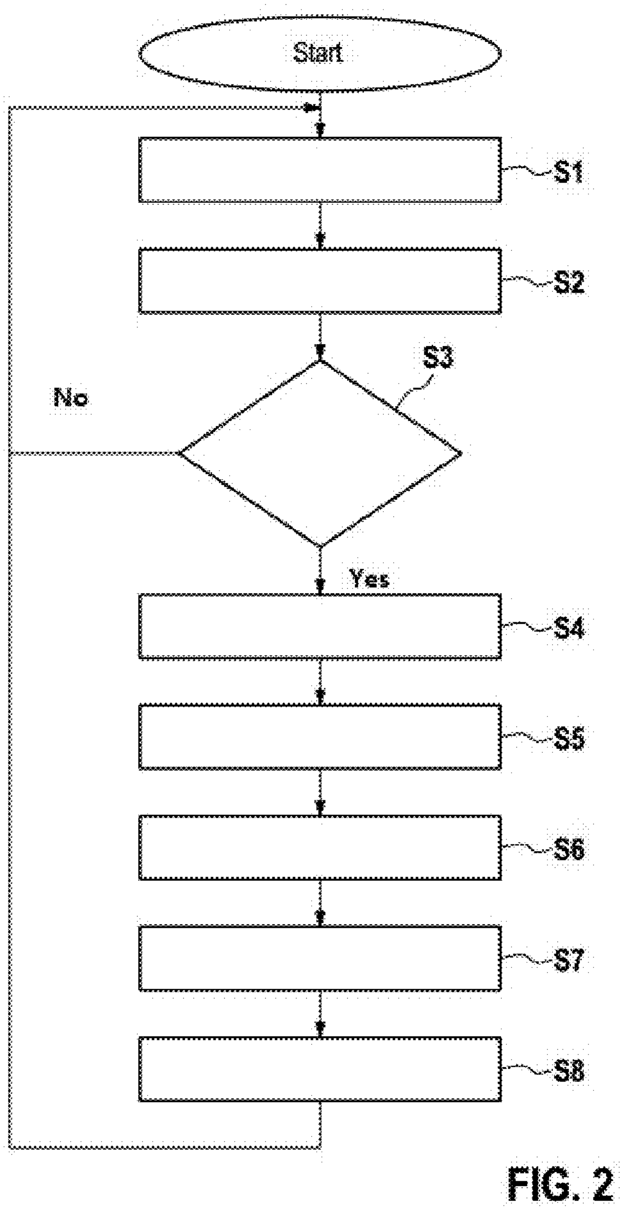
FIG. 2 a flowchart illustrating a method for providing an instruction for action after detection of an anomaly.

Based on the flow chart of FIG. 2, a method for predicting a certain error type of a vehicle battery in a battery-powered vehicle is described in more detail.

First, in step S1, operational variables are monitored in the control unit 43, in particular a battery control unit. The operational variables can include cell voltages, a phase current, a battery temperature, and a state of charge or cell states of charge.

In step S2, the temporal profiles of the operational variables can be evaluated using one or more anomaly detection models to detect an anomaly. The anomaly detection models can detect an anomaly of the vehicle battery 41 based on operating features obtained by feature extraction of the temporal profiles of the operational variables. The anomaly detection models can include rule-based and/or data-based models, such as a model trained on an autoencoder.

Accordingly, in step S3, it is checked whether there is an anomaly or an unexpected behavior of the vehicle battery 41.

If this is determined (alternative: yes), the method is continued with step S4, otherwise the monitoring is continuously continued with step S1.

In step S4, in a monitoring mode, error-relevant variables are monitored at an increased sampling rate. The error-relevant variables result from the previously observed abnormality or the observed unexpected behavior according to an assignment table that assigns the type of anomaly to the corresponding error-relevant variables, and can include, for example, a frequency of balancing, an indication of a temperature behavior, a state of charge profile, a profile of the open-circuit voltage (OCV profile), an aging state profile, a charging behavior, in particular the dependence between the state of charge and the temperature, a cell pressure profile and the like.

From the error-relevant variables recorded in this way, error-relevant features can be determined in step S5 by evaluation or aggregation, e.g. gradients of one or more of the error-relevant variables and/or operational variables can be evaluated or histograms, e.g. of the temporal distribution of the battery temperature and/or the distribution of cell pressures of the battery cells and/or the distribution of cell voltages (for detection of deep discharges), can be created, which can provide information about the error effect.

According to an error factor assignment table of a provided error evaluation model, in step S6, error-relevant features can be assigned a value as a measure of a propagation speed, an error severity and a propagation probability. The assignment is made using the error factor assignment table, which assigns a respective value of the corresponding error factors to one or a combination of several error-relevant features. Values for propagation speed, error severity and propagation probability can be within a predetermined range of values, for example, between 0 and 10. Other ranges of values are also possible for assigning the corresponding error factors.

In a subsequent step S7, a risk value is determined by multiplying the above error factors.

Depending on the risk value, interventions in the operation of the vehicle and/or the output of instructions for action can be made in step S8.

If the risk is low, for example at a risk value of less than 100, then a corresponding signaling of an anomaly that has occurred and an indication of a corresponding expected error type can occur first. This can be in conjunction with an instruction for action to go to a workshop as soon as possible.

For example, at a risk value in a mid-range between 100 and 300, a power limitation of the device battery can occur. For example, the charging and discharging current can be limited in order to avoid excessive loading of the vehicle battery. At the same time, an urgent instruction can be given that the driver should go to a workshop.

For example, if the risk value is greater than 300, an immediate operational stop of the device battery can be provided. An example of this can be a thermal runaway in case of which a fire of the vehicle battery is expected within a short time. Accordingly, the instruction for action must be made to the driver to stop and leave the vehicle as a matter of urgency.

The error-relevant features can be assigned to the corresponding error factors using an error factor assignment table. This can be continuously supplemented and completed by evaluating detected anomalies or unexpected behavior of vehicle batteries following a specific error. The assignment depends on the type of error that occurs during subsequent operation of the vehicle. For example, the time between the occurrence of the anomaly and the occurrence of the error can be assigned a propagation speed to a specific certain error type. In particular, periods of duration between the first occurrence of the anomaly and the occurrence of the error can be assigned to a corresponding value of the propagation speed. Furthermore, the type of functional impairment and risk to the vehicle and the user can be classified accordingly. A value for propagation probability can be derived from how often a specific error type results from detecting a specific anomaly. This can be done by observing the vehicle fleet with a plurality of vehicles.

Continuous adjustment of the error evaluation model can be made in the central processing unit 2. The evaluation of an anomaly for a specific vehicle can also be performed in the central processing unit 2 or after transmission of the parameters of the error evaluation model in the individual vehicles 4 of the vehicle fleet 3.

The invention claimed is:

1. A computer-implemented method for providing a risk value for a predicted error in a device battery of a technical device using an error evaluation model, wherein the error evaluation model has at least one provided error factor assignment table, the method comprising:

detecting, via a computer, temporal operational variable profiles of at least one device battery;

performing, via the computer, an anomaly detection as a function of the temporal operational variable profiles;

upon recognizing an anomaly, detecting, via the computer, error-relevant variables;

evaluating, via the computer, the error evaluation model as a function of the error-relevant variables to determine an error type of a predicted error;

assigning, via the computer, error factors to the error type using at least one provided error factor assignment table of the error evaluation model;

determining, via the computer, a risk value as a function of the error factors;

signaling, via the computer, the risk value; and updating, via the computer, the error evaluation model in a central processing unit based on operational variable profiles of a plurality of device batteries as a function of a detected anomaly and a subsequently occurring error of a certain error type.

2. The method according to claim 1, wherein the error-relevant variables comprise a frequency of balancing, a temperature behavior, a state of charge profile, an OCV profile (open-circuit voltage characteristic) for low states of charge, an aging state profile, a charging behavior and/or a cell pressure profile.

3. The method according to claim 1, wherein a feature extraction is performed with the error-relevant variables to obtain error-relevant features, wherein the error factors for the error type are determined using the error factor assignment table provided in the error evaluation model as a function of the error-relevant features.

4. The method according to claim 1, wherein the error factors comprise at least one of: a propagation speed of the error, a severity of the error, and a propagation probability of the error.

5. The method according to claim 4, wherein the propagation speed is determined based on a time duration between the determination of the anomaly and an occurrence of the subsequently occurring error.

6. The method according to claim 4, wherein the severity of the error is based on a remaining usability or remaining useful life of the device battery at a time of occurrence of the error.

7. The method according to claim 4, wherein the propagation probability of the error is based on identical detected anomalies across the plurality of device batteries and an occurrence of the subsequently occurring error.

8. The method according to claim 1, wherein the risk value is determined as a function of a multiplication of the error factors.

9. The method according to claim 1, wherein, depending on a level of the risk value and the type of error, an instruction for action is issued to a user of the device battery.

10. The method according to claim 1, wherein at least one of performing the anomaly detection and evaluating the error evaluation model is performed in a central processing unit remote from the device.

11. The method according to claim 1, wherein detecting error-relevant variables comprises detecting the operational variable profiles at a higher sampling rate, or wherein upon detection of the anomaly, the operational variable profiles are detected at a higher sampling rate.

12. A computer comprising a processor, the processor configured to detect, via a battery management system, temporal operational variable profiles of at least one device battery;

perform an anomaly detection as a function of the temporal operational variable profiles;

upon recognizing an anomaly, detect error-relevant variables;

evaluate an error evaluation model as a function of the error-relevant variables to determine an error type of a predicted error;

assign, error factors to the error type using at least one provided error factor assignment table of the error evaluation model;

determine a risk value as a function of the error factors;

signal the risk value; and update the error evaluation model in a central processing unit based on operational variable profiles of a plurality of device batteries as a function of a detected anomaly and a subsequently occurring error of a certain error type.

13. A non-transitory, computer-readable storage medium comprising instructions that, when executed by a computer, cause the computer to detect, temporal operational variable profiles of at least one device battery;

perform an anomaly detection as a function of the temporal operational variable profiles;

upon recognizing an anomaly, detect error-relevant variables;

evaluate an error evaluation model as a function of the error-relevant variables to determine an error type of a predicted error;

assign, error factors to the error type using at least one provided error factor assignment table of the error evaluation model;

determine a risk value as a function of the error factors;

signal the risk value; and update the error evaluation model in a central processing unit based on operational variable profiles of a plurality of device batteries as a function of a detected anomaly and a subsequently occurring error of a certain error type.

* * * * *